(12) United States Patent
Xia et al.

(10) Patent No.: US 10,411,399 B2
(45) Date of Patent: Sep. 10, 2019

(54) ELECTRICAL CABLE RETENTION (71) Applicant: PHILIPS LIGHTING HOLDING B.V., Eindhoven (NL)

(72) Inventors: Ying Xia, Eindhoven (NL); Liang Bao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/082,346

(22) PCT Filed: Mar. 31, 2017

(86) PCT No.: PCT/EP2017/057733
§ 371 (c)(1),
(2) Date: Sep. 5, 2018

(87) PCT Pub. No.: WO2017/174462
PCT Pub. Date: Oct. 12, 2017

(65) Prior Publication Data
US 2019/0115690 A1 Apr. 18, 2019

(30) Foreign Application Priority Data

Apr. 7, 2016 (WO) ................ PCT/CN2016/078679
May 3, 2016 (EP) ..................... 16168006

(51) Int. Cl.
*H01R 13/58* (2006.01)
*H02G 3/32* (2006.01)
(52) U.S. Cl.
CPC ........... *H01R 13/5812* (2013.01); *H02G 3/32* (2013.01)

(58) Field of Classification Search
CPC ............................. H01R 13/5812; H02G 3/32
(Continued)

(56) References Cited

U.S. PATENT DOCUMENTS

| 4,919,370 A * | 4/1990 | Martin | ..................... F16L 5/00 |
| | | | 174/153 G |
| 5,021,610 A * | 6/1991 | Roberts | ............. H01R 13/5812 |
| | | | 174/135 |

(Continued)

FOREIGN PATENT DOCUMENTS

| CN | 201623427 U | 11/2010 |
| CN | 201867516 U | 6/2011 |

(Continued)

*Primary Examiner* — Alexander Gilman (57) ABSTRACT

The present application discloses an assembly (30, 40) for securing an electrical cable (1) to a body (3) such as the body of an electrical appliance. The assembly comprises a clamping member (30) comprising a pair of spatially separated cable holes (31) dimensioned to receive the electrical cable and a pair of guide channels (33) inwardly extending from opposing edges (34) of the clamping member and a pair of anchoring members (40) for securing the clamping member to the body, each anchoring member comprising a major surface (41) transversely extending from a mounting surface, the major surface having an edge region defining a guide rail (42) for engaging with one of the guide channels and a pair of spatially separated ribs (43, 44) extending from the edge region across said major surface for retaining the clamping member. At least the anchoring members may form an integral part of the body of the electrical appliance. Also disclosed are an electrical appliance including at least part of this assembly and the method of securing an electrical cable to a body using this assembly.

15 Claims, 5 Drawing Sheets

(58) Field of Classification Search
USPC .......................................................... 439/470
See application file for complete search history.

(56) References Cited

U.S. PATENT DOCUMENTS

| | | | | |
|---|---|---|---|---|
| 5,352,854 | A * | 10/1994 | Comerci | H02G 3/0633 |
| | | | | 174/175 |
| 5,374,017 | A * | 12/1994 | Martin | F16L 5/00 |
| | | | | 174/153 G |
| 5,929,381 | A * | 7/1999 | Daoud | G02B 6/4448 |
| | | | | 174/135 |
| 5,950,970 | A * | 9/1999 | Methany | F16F 7/14 |
| | | | | 248/150 |
| 6,095,956 | A * | 8/2000 | Huang | A63B 21/0004 |
| | | | | 248/56 |
| 7,172,162 | B2* | 2/2007 | Mizukoshi | B60H 1/00557 |
| | | | | 248/49 |
| 7,322,784 | B2* | 1/2008 | Castro | F16B 37/0842 |
| | | | | 411/433 |
| 7,464,966 | B2* | 12/2008 | Miyajima | F16L 5/10 |
| | | | | 285/124.3 |
| 8,093,501 | B2* | 1/2012 | Stansberry, Jr. | H02G 7/05 |
| | | | | 174/146 |
| 8,747,145 | B2* | 6/2014 | Gossen | H01R 13/5812 |
| | | | | 439/460 |
| 8,919,717 | B2* | 12/2014 | Hauser | F16B 37/0842 |
| | | | | 248/309.1 |
| 9,080,698 | B2* | 7/2015 | Fukumoto | F16L 3/2235 |
| 9,334,887 | B2* | 5/2016 | Leo, II | F16B 2/22 |
| 9,644,777 | B2* | 5/2017 | Kato | F16L 55/035 |
| 9,941,625 | B2* | 4/2018 | Boemmel | H01R 13/516 |
| 10,199,984 | B2* | 2/2019 | Shetty | H01R 13/506 |
| 2007/0037438 | A1* | 2/2007 | Furuya | H01R 13/5833 |
| | | | | 439/456 |
| 2007/0215757 | A1* | 9/2007 | Yuta | F16L 3/2235 |
| | | | | 248/68.1 |
| 2007/0246614 | A1* | 10/2007 | Allmann | F16L 3/2235 |
| | | | | 248/65 |
| 2007/0261880 | A1* | 11/2007 | Cox | H02G 3/081 |
| | | | | 174/138 F |
| 2015/0053251 | A1* | 2/2015 | Hopf | H01R 4/2433 |
| | | | | 136/244 |

FOREIGN PATENT DOCUMENTS

| | | |
|---|---|---|
| CN | 203374976 U | 1/2014 |
| GB | 2300219 A | 10/1998 |
| GB | 2507082 A | 4/2014 |
| JP | 2011072164 | 4/2011 |

* cited by examiner

ELECTRICAL CABLE RETENTION

CROSS-REFERENCE TO PRIOR APPLICATIONS

This application is the U.S. National Phase application under 35 U.S.C. § 371 of International Application No. PCT/EP2017/057733, filed on Mar. 31, 2017, which claims the benefit of European Patent Application No. 16168006.1, filed on May 3, 2017, and Chinese Patent Application No. PCT/CN2016/078679, filed on Apr. 7, 2016. These applications are hereby incorporated by reference herein.

FIELD OF THE INVENTION

The present invention relates to an assembly for securing an electrical cable to a body.

The present invention further relates to an electrical appliance such as a luminaire comprising at least part of such an assembly.

The present invention yet further relates to a method of securing an electrical cable to a body of an electrical appliance using such an assembly.

BACKGROUND OF THE INVENTION

Mains-powered electrical appliances are typically connected to a mains power supply through an electrical cable that connects to the mains power supply with a plug. In many countries, it is a regulatory requirement that the electrical cable is appropriately secured to the electrical appliance for safety reasons. For example, in case of the electrical cable being pulled, the electrical cable should remain secured to the electrical appliance such that the live terminals of the electrical cable cannot become exposed due to the electrical cable disconnecting from the electrical appliance, which would cause an immediate safety hazard. For example, in China, the China Compulsory Certification (CCC) regulation requires that an electrical wire connected to an electrical appliance such as a luminaire is secured to the appliance for this reason.

Figure 1:
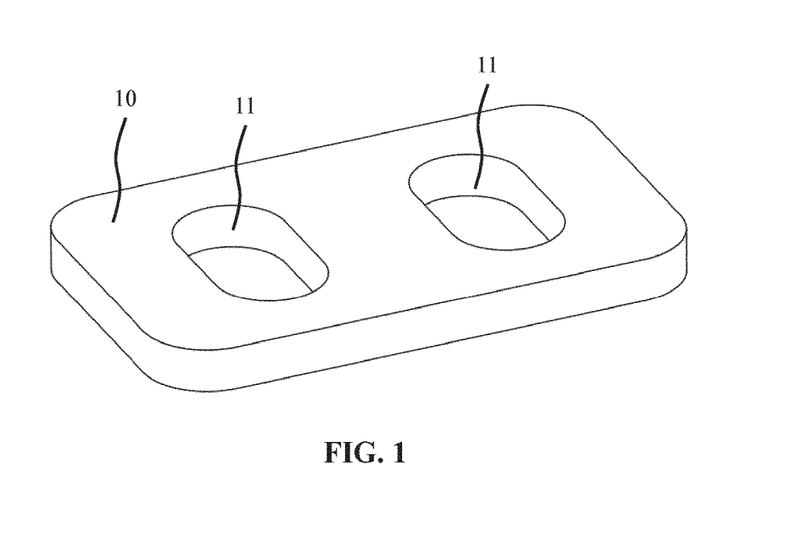
FIG. 1 schematically depicts a prior art electrical cable clamp.
Figure 2:
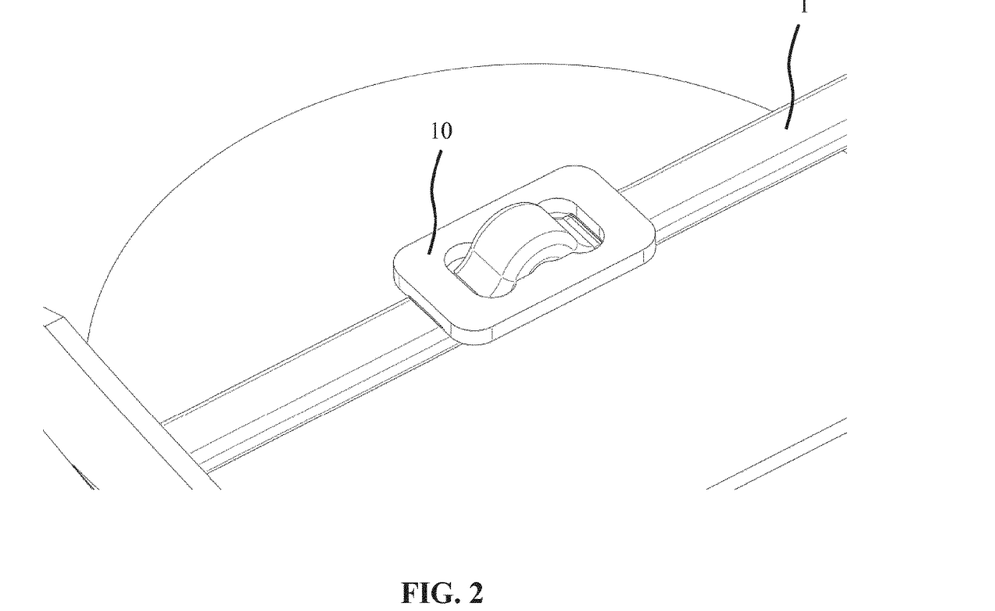
FIG. 2 schematically depicts the prior art electrical cable clamp of FIG. 1 into which an electric cable is clamped.

Several solutions exist for securing electrical cables. FIG. 1 schematically depicts a prior art clamp 10 having a pair of cable thread holes 11 through which an electrical cable 1 may be threaded to secure the cable to the clamp 10. FIG. 2 schematically depicts the electrical cable 1 threaded through the cable thread holes 11 of the clamp 10. The cable thread holes 11 are typically dimensioned such that the electrical cable 1 snugly fits into the cable thread holes 11, thereby retaining the electrical cable 1 through friction. Such a clamp 10 for example may be used to prevent coiling of the electrical cable 1, but is unsuitable for retaining the electrical cable 1 in an electrical appliance because the clamp 10 cannot be easily secured to or within the electrical appliance.

Figure 3:
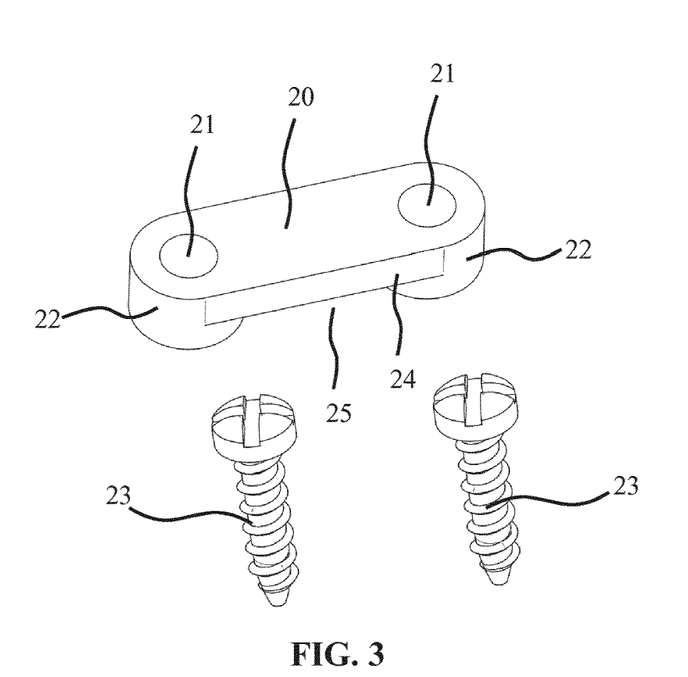
FIG. 3 schematically depicts part of a prior art assembly for securing an electrical cable.
Figure 4:
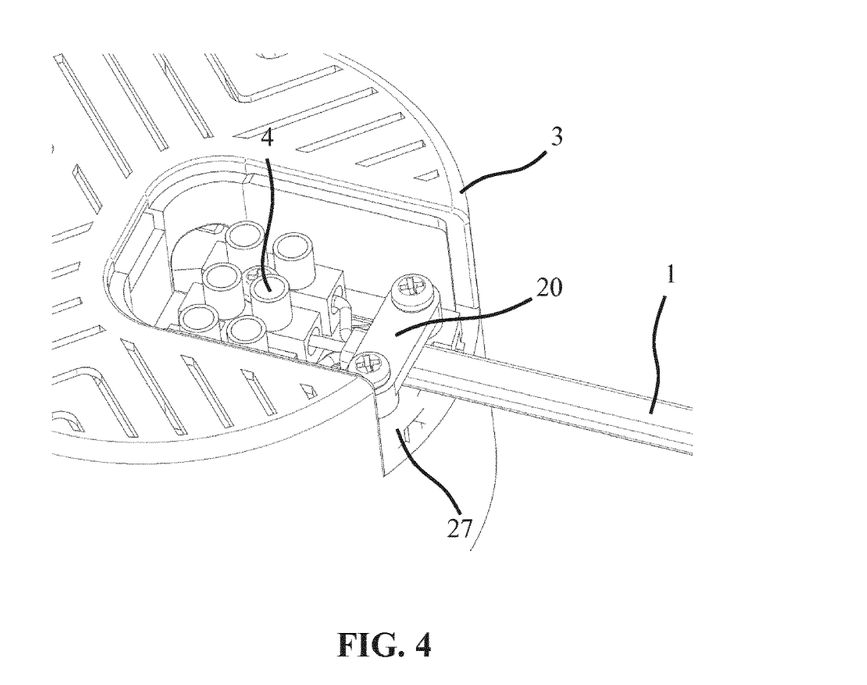
FIG. 4 schematically depicts the prior art assembly of FIG. 3 in which an electrical cable is secured to the body of an electrical appliance.

FIG. 3 schematically depicts a well-known assembly for securing an electrical cable to the body of an electrical appliance. The assembly comprises a bridge member 20 having opposing cylindrical body portions 22 including screw holes 21 for receiving screws 23. The opposing cylindrical body portions 22 are interconnected by a bridge portion 24 spanning over a gap 25 for receiving the electrical cable 1. The height of the gap 25 is typically less than the thickness of the electrical cable 1 such that when the bridge member 20 is screwed to an anchoring member 27 on the body 3 of the electrical appliance using the screws 23 as schematically depicted in FIG. 4, the resilient electrical cable 1 is squeezed (gripped) between the bridge member 20 and the anchoring member 27. Consequently, the release of the live terminals of the electrical from the electrical connectors 4 of the electrical appliance is prevented by this assembly if the electrical cable 1 is suddenly pulled.

Although this assembly ensures that the electrical cable 1 is safely secured to the electrical appliance, a drawback of this assembly is that it requires a hand tool, e.g. a screwdriver, to secure the electrical cable 1 onto the electrical appliance. This can be cumbersome in particular in situations where the electrical appliance needs to be installed in a space that is difficult to access, for example the installation of a luminaire in a ceiling, where the electrical cable 1 is typically hidden in a dead space above the ceiling that can only be accessed through the holes in the ceiling in which the luminaire is to be fitted.

GB 2 300 219 A discloses an assembly for clamping a cable relative to a body. The assembly comprises a clamping element having clamping surfaces between which, in use, the cable is disposed; and a formation on said body adapted to engage with said clamping element to cause said clamping surfaces of said element tightly to grip a cable disposed therebetween. This assembly is relatively complex and therefore costly.

SUMMARY OF THE INVENTION

The present invention seeks to provide an inexpensive assembly for securing an electrical cable to a body of an electrical appliance that does not require the use of hand tools to secure the electrical cable to the electrical appliance.

The present invention further seeks to provide an electrical appliance including at least part of such an assembly.

The present invention yet further seeks to provide a method of securing an electrical cable to the body of an electrical appliance using such an assembly.

According to an aspect, there is provided an assembly for securing an electrical cable to a body of an electrical appliance, the assembly comprising a clamping member comprising a pair of spatially separated cable holes dimensioned to receive the electrical cable and a pair of guide channels inwardly extending from opposing edges of the clamping member; and a pair of anchoring members for securing the clamping member to the body, each anchoring member comprising a major surface transversely extending from a mounting surface, the major surface having an edge region defining a guide rail for engaging with one of the guide channels and a pair of spatially separated ribs extending from the edge region across said major surface for retaining the clamping member.

Such an assembly allows for the securing of the electrical cable to the body of the electrical appliance without the need for a hand tool because the electrical cable simply can be threaded through the spatially separated cable holes of the clamping member similar to the clamping member as shown in FIG. 1, after which the clamping member including the electrical cable can be secured in between the pair of anchoring members by engaging the guide channels with the guide rails of the opposing anchoring members, e.g. by downwardly sliding the clamping member along the guide rails until the clamping member is secured in between the spatially separated ribs of the respective anchoring members. The spatially separated ribs of the respective anchoring members prevent twisting (out of plane rotation) of the clamping member, whereas the major surfaces prevent in plane translation of the clamping member, thereby effectively securing the electrical cable to the body of the electrical appliance.

In an embodiment, the pair of spatially separated ribs includes a first rib and a second rib, wherein the first rib is shaped to allow irreversible passage of the clamping member along the guide rail towards the second rib; and the second rib is shaped to prevent passage of the clamping member along the guide rail beyond the second rib. In this manner, the clamping member may be irreversibly retained between the pair of spatially separated ribs, thus effectively securing the electrical cable to the body of the electrical appliance.

The first rib may have a first surface that gradually increases the thickness of the guide rail, such that the guide channel can be gradually forced over the first surface. For example, the first rib may have a triangular cross-section including a surface section normal to the major surface, the surface section facing the second rib. The sloped surface portion of the triangular cross-section, i.e. the first surface portion, facilitates the gradual forcing of the guide channel over the first rib, whereas the surface section facing the second rib provides a step in the thickness of the guide rail that prevents the clamping member from travelling in the opposite direction over the first rib.

The second rib may have a rectangular cross-section to provide a step in the thickness of the guide rail that prevents the clamping member from travelling beyond the second rib.

Each anchoring member may further comprise a further rib on the major surface, the further rib extending from the second rib to the mounting surface in order to increase the structural integrity of the anchoring member. Such a further rib may be outwardly tapering in the direction of the mounting surface.

The anchoring members may be separate members. However, to avoid the need of having to accurately space the anchoring members, the pair of anchoring members may be adjoined by a mounting plate comprising their respective mounting surfaces.

The spatially separated cable holes of the clamping member may be separated by a body portion of the clamping member, wherein the guide channels of the clamping member extend into said body portion. This provides a clamping member having good structural integrity that can be easily manufactured.

In at least some embodiments, the clamping member is plate-shaped to facilitate engagement of the clamping member with the pair of anchoring members.

The clamping member and a pair of anchoring members may be made of any suitable material. In at least some embodiments, the clamping member and the pair of anchoring members are individually made of plastic, a metal or a metal alloy. These materials are particularly preferred because it allows the clamping member and the anchoring members to be manufactured in inexpensive manner.

According to another aspect, there is provided an electrical appliance comprising a body comprising at least the anchoring members of the assembly according to embodiments of the present invention. Preferably, the anchoring members are integral to the body of the electrical appliance such that an installer of the electrical appliance does not have to secure the anchoring members to the electrical appliance body. Moreover, by forming the anchoring members as an integral part of the body of the electrical appliance, e.g. by moulding the body including the anchoring members using moulding techniques such as injection moulding, a particularly robust anchoring of the mounting plate to the body of the electrical appliance can be achieved.

In at least some embodiments, the electrical appliance is a luminaire such as a ceiling down lighter although the teachings of the present invention may be applied to any electrical appliance.

According to yet another aspect, there is provided a method of securing an electrical cable to a body of an electrical appliance using the assembly according to any of the embodiments of the present invention, the method comprising securing the anchoring members to the body; securing the electrical cable in the cable holes of the clamping member; and sliding the guide channels of the clamping member including the secured electrical cable along the guide rails of the anchoring members to secure the clamping member between respective pairs of spatially separated ribs. Preferably, the step of securing the anchoring met members to the body of the electrical appliance comprises forming the anchoring members integral to the body of the electrical appliance although alternative embodiments, embodiments in which the anchoring members are secured to a body of the electrical appliance separate to the anchoring members may also be contemplated.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

Figure 5:
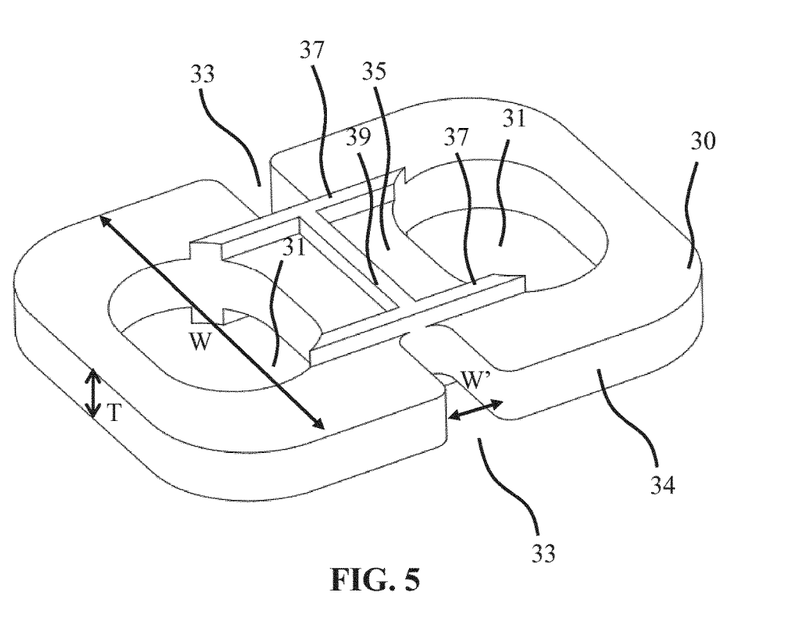
FIG. 5 schematically depicts a cable clamping member of an assembly according to an embodiment.
Figure 6:
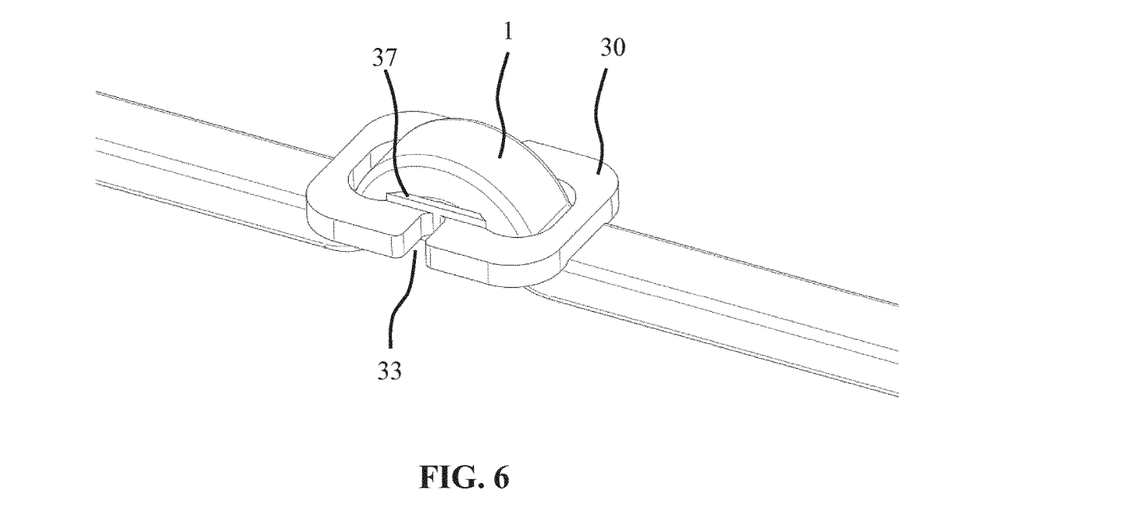
FIG. 6 schematically depicts the cable clamping member of FIG. 5 in engagement with an electrical cable.

FIG. 5 schematically depicts a cable clamping member 30 of an electrical cable securing assembly according to an embodiment of the present invention. The clamping member 30 is shaped as a plate having a thickness T and comprising two spatially separated cable holes 31 through which an electrical cable 1 may be threaded, as schematically depicted in FIG. 6. The cable holes 31 are typically shaped such that they match the cross-sectional shape of the electrical cable 1. For example, in case of an electrical cable 1 having a circular cross-section, the cable holes 31 will have a circular shape, and so on. The cable holes 31 may be separated by a body portion 35 of the clamping member 30. The body portion 35 may carry an optional rib arrangement including a pair of ribs 37 extending between the cable holes 31 and a cross-rib 39 extending between the pair of ribs 37 that may assist in retaining the electrical cable 1.

The clamping member 30 further comprises a pair of guide channels 33 that are inwardly extending from opposing edges 34 of the clamping member 30. The guide channels 33 preferably extend towards each other into the body portion 35 of the clamping member 30. Each guide channel 33 has a width W' dimensioned to receive a guide rail of an anchoring member of the assembly as will be explained in further detail below.

The clamping member 30 may be manufactured in any suitable manner from any suitable material. For example, the clamping member 30 may be stamped or molded using a material such as a metal, metal alloy or a plastic or polymer material. The clamping member 30 may comprise a maximum width W, which may be the maximum width of the clamping member 30 in between the opposing edges 34 of the clamping member 30.

Figure 7:
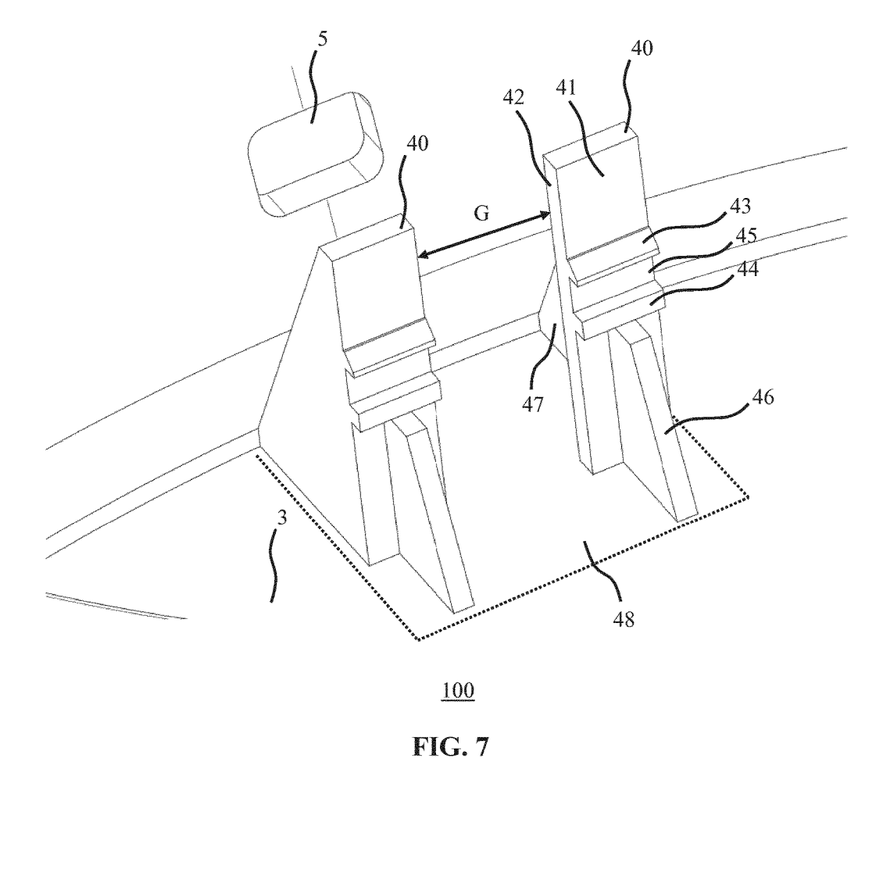
FIG. 7 schematically depicts a pair of anchoring members of an assembly according to an embodiment.

The electrical cable securing assembly further comprises a pair of anchoring members 40, which are schematically depicted in FIG. 7 on the body 3 of an electrical appliance 100. The anchoring members 40 are typically spaced apart by a gap G having a dimension less than the full width W of the clamping member 30, i.e. G<W.

Each anchoring member 40 comprises a mounting surface for contacting the body 3 of the electrical appliance. In case of separate anchoring members 40, an installer using the electrical cable securing assembly may need to manually position the respective anchoring members 40 such that the respective anchoring members 40 are appropriately aligned and separated by the intended gap G. Alternatively, the anchoring members 40 may be mounted on a mounting plate 48 such that an installer using the electrical cable securing assembly does not have to manually position the anchoring members 40 because they are pre-positioned in the correct position on the mounting plate 48.

The mounting surfaces of anchoring members 40, e.g. the mounting surfaces of anchoring members 40 forming part of the mounting plate 48, may be secured on to the body 3 of the electrical appliance 100 in any suitable manner. For example, the body 3 may comprise an engagement member arrangement, e.g. a slide rail arrangement or the like for receiving the anchoring members 40 or the mounting plate 48. Alternatively, the mounting surfaces of the anchoring members 40 or mounting plate 48 may comprise a strong adhesive for bonding the anchoring members 40 or mounting plate 48 to the body 3 of the electrical appliance 100. As yet another example, a hook and eye arrangement may be provided in which an anchoring member 40 or a mounting plate 48 comprises a hook and the body 3 of the electrical appliance 100 comprises an eye (or vice versa) for securing the anchoring members 40 to the electrical appliance 100.

In a preferred embodiment, the anchoring members 40 form an integral part of the body 3 of the electrical appliance 100. For example, the body 3 may be a molded body, e.g. formed by injection molding or the like, in which the anchoring members 40 form part of the body 3, e.g. form part of the housing of the electrical appliance 100.

Each anchoring member 40 has a major surface 41 that transversely extends from its mounting surface, e.g. from the body 3. For example, each major surface 41 may perpendicularly extend from its mounting surface. Each major surface 41 further comprises an edge, wherein the respective edges of the pair of anchoring members 40 face each other across the gap G. These edges define respective guide rails 42 for the guide channels 33 of the cable clamping member 30, wherein the width W' of the guide channels 33 allows the guide channels 33 to receive a respective guide rail 42 of an anchoring member 40.

Each anchoring member 40 further comprises a first rib 43 and a second rib 44 extending from the edge region defining part of the guide channel 42 across at least a part of the major surface 41. The first rib 43 and the second rib 44 may extend across the full width of the major surface 41 in some embodiments (as shown in FIG. 7) although this is not essential. The first rib 43 is spatially separated from the second rib 44 such that a channel 45 is delimited by the first rib 43 and the second rib 44. The channel 45 typically has a height as defined by the distance between the first rib 43 and the second rib 44 that matches the thickness T of the cable clamping member 30, i.e. the channel 45 is dimensioned to receive the cable clamping member 30.

The first rib 43 may be shaped to allow irreversible passage of the clamping member 30 along the guide rail 42 towards the second rib 44. For example, the first rib 43 first rib may have a first surface that gradually increases the thickness of the guide rail 42, such that the guide channel 33 of the clamping member 30 can be gradually forced over the first surface. For example, as shown in FIG. 7, the first rib 43 may have a triangular cross-section, in which the inclined upper surface allows the clamping member 30 to be forced into the channel 45. The surface section of the first rib 43 that faces the second rib 45 may be normal to the major surface 41 to provide a step in the thickness of the guide rail 42 that prevents the clamping member 30 from travelling in the opposite direction over the first rib 43. Instead of a triangular cross-section, it will be immediately understood by the skilled person that the first rib 43 may have any suitable alternative cross-section that facilitates the irreversible passage of the clamping member 30 along the guide rail 42 towards the second rib 44. For example, the upper surface of the first rib 43 may be curved surface rather than a planar surface as shown in FIG. 7.

The second rib 44 is typically shaped to prevent the clamping member 30 from travelling along the guide rail 42 beyond the second rib 44, such that the clamping member 30 is retained in the channel 45 between the first rib 43 and the second rib 44. For example, the second rib 44 have a rectangular cross-section to provide a step in the thickness of the guide rail that prevents the clamping member 30 from travelling beyond the second rib 44.

Each anchoring member 40 optionally may further comprise one or more reinforcement ribs for reinforcing and/or stabilising the anchoring member 40. For example, each anchoring member 40 may comprise a further rib 46 on the major surface 41 extending from the second rib 44 to the mounting surface of the anchoring member 40 e.g. extending to the body 3 of the electrical appliance 100. Such a further rib 46 for example may be outwardly tapering in the direction of the mounting surface to provide the desired stability and/or structural integrity of the anchoring member 40. By way of non-limiting example, the anchoring members 40 in FIG. 7 comprise a further stabilizing rib 47 extending from a further major surface opposite the major surface 41.

The anchoring members 40 may be made in any suitable manner using any suitable material. For example, the anchoring members 40 may be stamped or molded using a material such as a metal, metal alloy or a plastic or polymer material. In a particularly advantageous embodiment, the anchoring members 40 are formed as part of the body 3 of the electrical appliance to provide a particularly robust anchoring mechanism for the electrical cable 1 secured within the cable clamping member 30.

Figure 8:
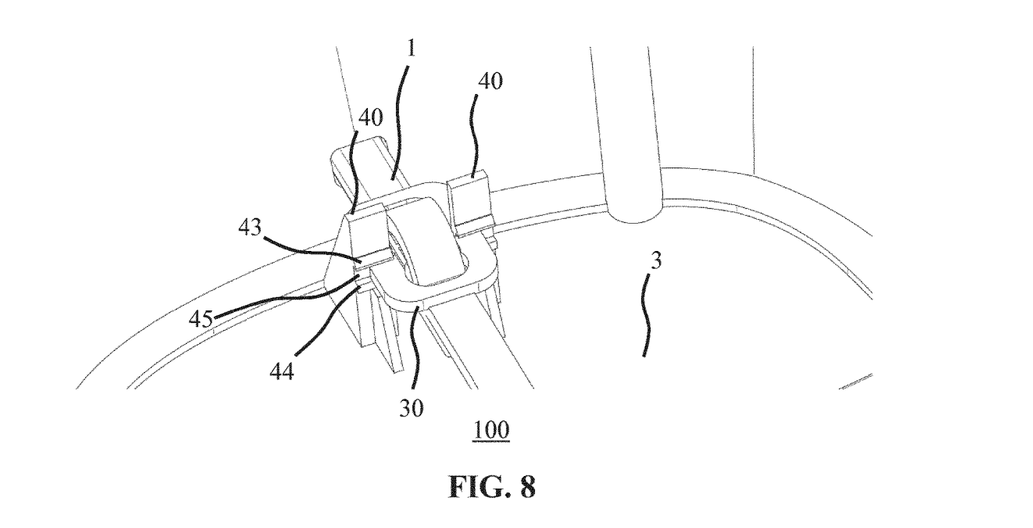
FIG. 8 schematically depicts the pair of anchoring members of FIG. 7 in engagement with the cable clamping member of the assembly according to an embodiment.

The body 3 may comprise a cable entry hole 5 through which the electrical cable 1 may be inserted into the electrical appliance 100 for connection to the electrical terminals 4 (not shown in FIG. 7) of the electrical appliance 100. During installation, the installer may thread the electrical cable 1 through the cable entry hole 5 of the body or housing 3 of the electrical appliance 100 after which the installer may thread the electrical cable 1 through the cable clamping member 30 of the electrical cable securing assembly according to embodiments of the present invention as shown in FIG. 6 after which the installer may slide the guide channels 33 of the clamping member 30 including the secured electrical cable 1 along the guide rails 42 of the anchoring members 40 to secure the clamping member 30 in the channel 45 between the first rib 43 and the second rib 44 of the respective anchoring members 40 as schematically depicted in FIG. 8 to secure the electrical cable 1 to the body 3 of the electrical appliance 100.

Figure 9:
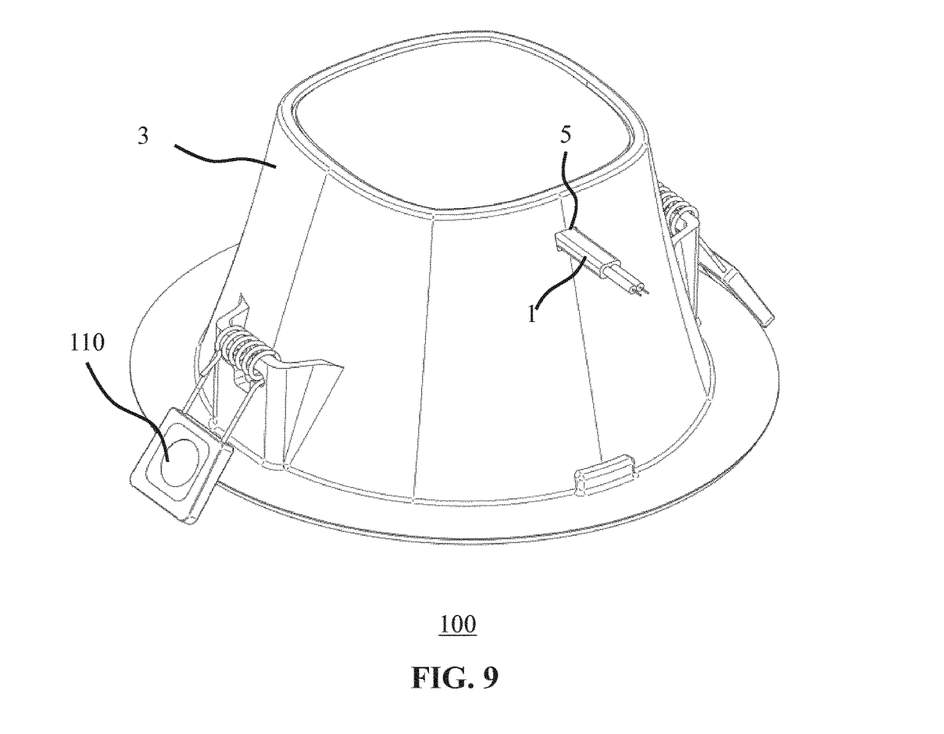
FIG. 9 schematically depicts an electrical appliance onto which an electrical cable is secured using the assembly according to an embodiment.

An example embodiment of such an electrical appliance 100 is schematically depicted in FIG. 9. In this example embodiment, the electrical appliance 100 is a luminaire such as a ceiling spotlight comprising spring-loaded support members 110 for immobilizing the luminaire on an upper surface of the ceiling. An electrical cable 1 is secured inside the body 3 using the electrical cable securing assembly according to an embodiment of the present invention as previously explained, with the electrical cable 1 entering the luminaire through the cable entry hole 5.

At this point, it is reiterated for the avoidance of doubt that although in specifically described embodiments the electrical appliance 100 is a luminaire such as a ceiling spotlight, it will be immediately understood that the electrical cable securing assembly of the present invention may be used for any type of electrical appliance, with at least the anchoring members 40 optionally forming an integral part of the body or housing of such an electrical appliance.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An assembly for securing an electrical cable to a body, the assembly comprising:
   a clamping member comprising a pair of spatially separated cable holes dimensioned to receive the electrical cable and a pair of guide channels inwardly extending from opposing edges of the clamping member; and
   a pair of anchoring members for securing the clamping member to the body, each anchoring member comprising a major surface transversely extending from a mounting surface, the major surface having an edge region defining a guide rail for engaging with one of the guide channels and a pair of spatially separated ribs extending from the edge region across said major surface for retaining the clamping member.

2. The assembly of claim 1, wherein the pair of spatially separated ribs includes a first rib and a second rib, wherein:
   the first rib is shaped to allow irreversible passage of the clamping member along the guide rail towards the second rib; and
   the second rib is shaped to prevent passage of the clamping member along the guide rail beyond the second rib.

3. The assembly of claim 2, wherein the first rib has a triangular cross-section including a surface section normal to the major surface, the surface section facing the second rib.

4. The assembly of claim 2, wherein the second rib has a rectangular cross-section.

5. The assembly of claim 1, wherein each anchoring member further comprises a further rib on the major surface, the further rib extending from the second rib to the mounting surface.

6. The assembly of claim 5, wherein the further rib is outwardly tapering in the direction of the mounting surface.

7. The assembly of claim 1, wherein the pair of anchoring members are adjoined by a mounting plate comprising their respective mounting surfaces.

8. The assembly of claim 1, wherein the spatially separated cable holes are separated by a body portion of the clamping member, said guide channels extending into said body portion.

9. The assembly of claim 1, wherein the clamping member is plate-shaped.

10. The assembly of claim 1, wherein the clamping member is made of plastic, a metal or a metal alloy.

11. The assembly of claim 1, wherein each anchoring member is made of plastic, a metal or a metal alloy.

12. An electrical appliance comprising a body, the body comprising at least the anchoring members of the assembly of claim 1 secured to the body.

13. The electrical appliance of claim 12, wherein the anchoring members are integral to the body.

14. The electrical appliance of claim 12, wherein the electrical appliance is a luminaire.

15. A method of securing an electrical cable to a body using the assembly of claim 1, the method comprising:
   securing the anchoring members to the body;
   securing the electrical cable in the cable holes of the clamping member; and
   sliding the guide channels of the clamping member including the secured electrical cable along the guide rails of the anchoring members to secure the clamping member between respective pairs of spatially separated ribs.

* * * * *